United States Patent
Chandler et al.

[19]

[11] Patent Number: 6,155,066
[45] Date of Patent: Dec. 5, 2000

[54] INJECTOR, METHODS FOR USING INJECTOR, AND KIT

[75] Inventors: Thomas D. Chandler, Coon Rapids; William S. Dea, Bloomington; Brandon M. Reid, Minneapolis, all of Minn.

[73] Assignee: Century Manufacturing Company, St. Paul, Minn.

[21] Appl. No.: 09/150,974

[22] Filed: Sep. 10, 1998

[51] Int. Cl.⁷ ............................................. F25B 45/00
[52] U.S. Cl. ........................................ 62/292; 62/192
[58] Field of Search ........................ 62/149, 192, 298, 62/292, 84

[56] References Cited

U.S. PATENT DOCUMENTS

| | | |
|---|---|---|
| 940,572 | 11/1909 | Agner . |
| 972,793 | 10/1910 | Allred . |
| 1,604,392 | 10/1926 | Davis . |
| 1,613,821 | 11/1927 | Frawley . |
| 1,672,421 | 6/1928 | Negley . |
| 2,083,035 | 6/1937 | Rogers . |
| 2,102,591 | 12/1937 | Hagemeier . |
| 2,236,727 | 4/1941 | Dewees . |
| 2,367,347 | 1/1945 | Good . |
| 2,634,889 | 4/1953 | Sherbondy . |
| 2,768,678 | 10/1956 | Cornell et al. . |
| 2,776,075 | 1/1957 | Etter . |
| 2,889,085 | 6/1959 | Collins . |
| 3,430,819 | 3/1969 | Moonan . |
| 3,538,961 | 11/1970 | Bruce . |
| 3,795,262 | 3/1974 | Post . |
| 3,797,534 | 3/1974 | Skidmore . |
| 4,467,620 | 8/1984 | Bradley et al. . |
| 4,698,983 | 10/1987 | Hechavarria . |
| 4,913,323 | 4/1990 | Scheindel . |
| 4,999,976 | 3/1991 | Smith . |
| 5,027,605 | 7/1991 | Hardesty . |
| 5,297,399 | 3/1994 | Tieken . |
| 5,336,065 | 8/1994 | Tieken . |
| 5,357,782 | 10/1994 | Henry . |
| 5,377,724 | 1/1995 | Ray . |
| 5,421,159 | 6/1995 | Stokes . |
| 5,535,790 | 7/1996 | Hirz . |
| 5,555,740 | 9/1996 | Stevenson . |

(List continued on next page.)

FOREIGN PATENT DOCUMENTS

| | | |
|---|---|---|
| 0 587 545 A2 | 3/1994 | European Pat. Off. . |
| 613279 | 11/1926 | France . |
| 11155 | 8/1887 | United Kingdom . |
| WO 98/12109 | 3/1998 | WIPO . |

OTHER PUBLICATIONS

"A Breath of Fresh Air from Cliplight", Cliplight Manufacturing Company of Toronto, Ontario Canada, 6 pages (Date Unknown).

(List continued on next page.)

*Primary Examiner*—William Doerrler
*Assistant Examiner*—Melvin Jones
*Attorney, Agent, or Firm*—Merchant & Gould P.C.

[57] ABSTRACT

An injector for introducing a fluid composition into an air conditioning system is provided. The injector includes a pump including an internal volume having a first opening and a second opening, and a plunger which moves within the internal volume between a first position and a second position. The first opening includes a first valve for selectively allowing the fluid composition to flow from the internal volume as the plunger moves from the first position to the second position. The second opening includes a second valve for selectively allowing the fluid composition to flow into the internal volume as the plunger moves from the second position to the first position. A hose is provided having a first end connected to the first opening, and a second end constructed for attachment to a port on an air conditioning system. A cartridge including a fluid composition is provided fluidly connected to the second opening of the pump. Methods for injecting lubricant into an air conditioning system and detecting leaks in an air conditioning system are provided. A kit for detecting leaks in an air conditioning system is provided.

16 Claims, 4 Drawing Sheets

U.S. PATENT DOCUMENTS

| | | |
|---|---|---|
| 5,638,997 | 6/1997 | Hawkins et al. . |
| 5,650,563 | 7/1997 | Cooper et al. . |
| 5,674,000 | 10/1997 | Kalley . |
| 5,681,984 | 10/1997 | Cavestri . |
| 5,699,678 | 12/1997 | Trigiani . |
| 5,826,636 | 10/1998 | Trigiani . |
| 6,050,310 | 4/2000 | Trigiani . |

OTHER PUBLICATIONS

"APD™ Leak Detection System. Automotive Leak Detection Solutions", Corrosion Consultants Inc. of Roseville, Michigan, 6 pages (1997).

"Bright Solutions. The Future of Leak Detection is Here", Bright Solutions, Inc. of Troy, Michigan, 4 pages (1996).

"Cliplight Introduces the Most Advanced Method of Introducing Fluorescent Additive into Refrigerant and A/C Systems. Dye–Stick™", Cliplight Manufacturing Company of Toronto, Ontario Canada, 4 pages (Date Unknown).

"Fluoro–Dye. MPD System™ mutli–purpose", 7 pages (Date Unknown).

"Leaks Can't Hide from the Tracker™!. Superior dyes . . . extra–durable lamp . . . and injectors that work on a pressurized air conditioning system make this the easiest to use, most economical UV leak detection system available!", Robinair Division, SPX Corporation of Montpelier, Ohio, 2 pages (May 1996).

"Master Installer 24 Car Retrofit Kit. Start Up 6 Car Retrofit Kit", 5 pages (Date Unknown).

"Pinpoint Every Leak!. Only One Leak Detector Does it All!", Tracer Products, a Division of Spectronics Corporation of Westbury, New York, 4 pages (Mar. 1997).

"The Most Powerful Leak Detection Lamps on Earth!", Tracer Products, a Division of Spectronics Corporation of Westbury, New York, 2 pages (Oct. 1997).

"Ultra Violet Leak Detection System", Bayco Products Inc. of Dallas, Texas, 15 pages (1997).

INJECTOR, METHODS FOR USING INJECTOR, AND KIT

FIELD OF THE INVENTION

This invention relates to an injector, a method for detecting leaks in an air conditioning system, a method for injecting lubricant into an air conditioning system, and a kit for detecting leaks in an air conditioning system. More particularly, the invention relates to introducing lubricant and/or dye into an air conditioning system for detection of leaks.

BACKGROUND OF THE INVENTION

Air conditioning systems often generate a leak which allows refrigerant to escape. In order to detect the leak, a dye can be injected into the air conditioning system so that it mixes with the refrigerant. The dye can then be detected in the refrigerant which leaves the air conditioning system through a leak. As a result, the leak in the air conditioning system can be detected and repaired.

After an air conditioning system is serviced, it is often necessary to inject a lubricant into the air conditioning system so that it combines with the refrigerant and provides lubrication of the internal components. A difficulty encountered when injecting a lubricant into an air conditioning system containing a refrigerant is that the pressure within the system is generally fairly high. In order to force the lubricant into the air conditioning system, one needs to inject the lubricant at a pressure which is greater than the pressure within the air conditioning system.

Numerous injectors are presently available on the market for use with automobile air conditioning systems. Exemplary injectors are available under the name DYE-STICK™ from Cliplight and under the name Tracerline® from Tracer Products of Westburg, N.Y. Other companies which manufacture injectors include Bayco Products, Inc. of Dallas, Tex.; Robinair of Montpelier, Ohio; and Bright Solutions, Inc. of Troy, Mich.

Several patents describe various injectors and techniques for detecting leaks in closed systems. For example, see U.S. Pat. Nos. 5,699,6778; 5,681,984; and 5,674,000. Numerous injectors have been described for introducing lubricant into an air conditioning system. For example, see U.S. Pat. Nos. 4,467,620 and 5,699,678.

SUMMARY OF THE INVENTION

An injector for introducing a fluid composition into an air conditioning system is provided by the present invention. The injector includes a pump having an internal volume and a plunger which moves within the internal volume between a first position and a second position. The internal volume has a first opening including a first valve and a second opening including a second valve. The first valve is provided for selectively allowing the fluid composition to flow from the internal volume as the plunger moves from the first position to the second position. The second valve is provided for selectively allowing the fluid composition to flow into the internal volume as the plunger moves from the second position to the first position. Preferably, the valves are check valves. The injector includes a hose having a first end connected to the first opening, and a second end constructed for attachment to an air conditioning port. A cartridge is provided containing a fluid composition which is fluidly connected to the second opening of the internal volume. Preferably, the pump includes a spring for biasing the plunger to the first position, and the plunger includes a piston which can be actuated by depressing a handle.

The fluid composition can be used for providing lubrication and/or dye to an air conditioning system. After an air conditioning system has been serviced, it is often advantageous to introduce a metered amount of lubricant into the system. Accordingly, the injector provides for introducing a premeasured amount of fluid composition into an air conditioning system. When an air conditioning system develops a leak, it is advantageous to inject a fluid composition including a dye into the air conditioning system. As the dye mixes with the refrigerant, a leak can be detected by observing whether dye leaves the air conditioning system. Preferably, the dye is a fluorescent dye and is mixed into a lubricant carrier to provide the fluid composition.

Methods for detecting leaks in an air conditioning system and for injecting lubricant into an air conditioning system are provided by the present invention. The methods generally include attaching the injector to an air conditioning system port and injecting the fluid composition into the air conditioning system.

A kit for detecting leaks in an air conditioning system is provided by the present invention. The kit can include an injector for introducing a fluid composition into an air conditioning system, and a lamp for exciting a dye contained within the fluid composition. The kit can additionally include goggles for assisting in the detection of dye, such as fluorescent dye, an adapter for providing attachment of the injector to either an R12 or R134a refrigerant system, and a replacement cartridge containing fluid composition.

DETAILED DESCRIPTION OF THE DRAWINGS

Figure 1:
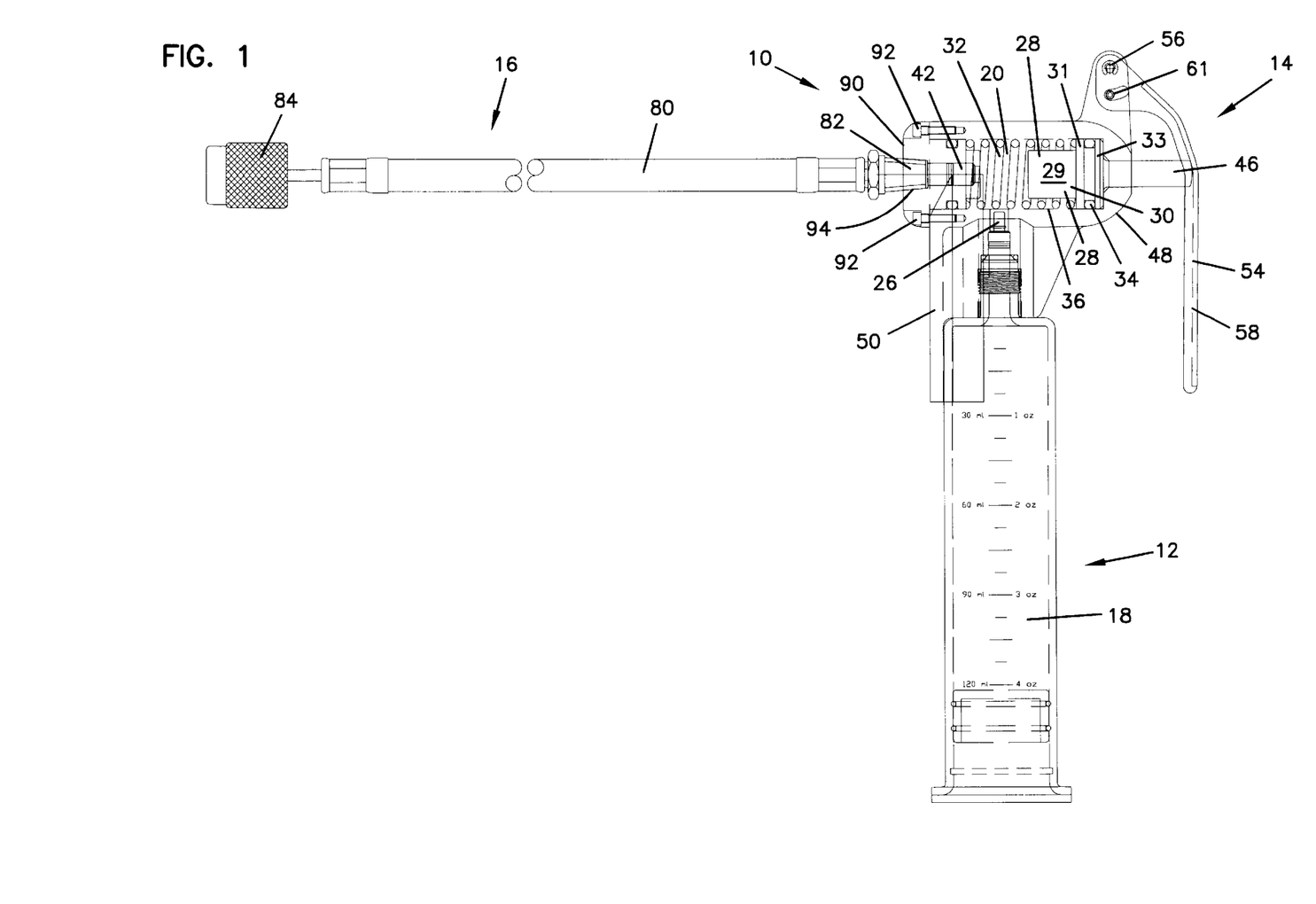
FIG. 1 is a partial cut away view of an injector according to the principles of the present invention.

Now referring to FIG. 1, an injector according to the present invention is indicated at reference numeral 10. The injector 10 includes three general regions. These regions include a receiver region 12 for providing a source of fluid for injection into an air conditioning system, a pump region 14 for pumping the fluid from the receiver region 12 and into the air conditioning system, and delivery region 16 for providing a connection between the pump region 14 and the air conditioning system. The fluid for injection into an air conditioning system can be referred to as the fluid composition 18. The fluid composition 18 is stored in the receiver region 12, then drawn out of the receiver region 12 and through the pump region 14 and the delivery region 16 for injection into the air conditioning system.

The fluid composition 18 can be used for providing lubrication within an air conditioning system and/or for introducing a dye into the air conditioning system for detection of leaks. When an air conditioning system is serviced, it is often advantageous to introduce a measured amount of lubricant into the air conditioning system for providing lubrication of the components within the air conditioning system. It is not always necessary to include a dye within the lubricant. However, in situations where leak detection is desired, a dye can be incorporated into the lubricant. In such a situation, the lubricant can be referred to as a carrier for the dye. Alternatively, other carriers can be used for assisting in introducing the dye into an air conditioning system. Furthermore, it should be appreciated that while the invention is described in the context of introducing a fluid composition into an air conditioning system, the invention is applicable to any type of refrigeration system which includes a closed loop which circulates refrigerant for providing heat exchange. A preferred application of the injector of the invention is for introducing the fluid composition into an automobile air conditioning system.

The dye and lubricant which can be incorporated into the fluid composition 18 are preferably compatible with the refrigerant used in the air conditioning system into which it will be injected. Accordingly, the selection of the dye and lubricant may depend upon the refrigerant used within the air conditioning system. Certain dyes and lubricants are compatible with R12 refrigerant, and certain dyes and lubricants are compatible with R134a refrigerant. These types of refrigerants can be referred to as chlorofluorocarbon (CFC-12) refrigerant and hydrofluorocarbon (HFC-134a) refrigerant. Preferred dyes and lubricants which can be used in the invention are universal which means that they are compatible with both R12 and R134 refrigerants.

Dyes which can be used in the dye containing composition includes single dyes and mixtures of dyes. Dyes which can be used with refrigerant according to the invention include those disclosed in U.S. Pat. No. 4,467,620 to Bradley, et al. and U.S. Pat. No. 5,681,984 to Cavestri, the disclosures of which are incorporated herein by reference. The dyes which are preferably used according to the invention fluoresce when energized. Accordingly, these types of dyes can easily be detected. Exemplary dyes which can be used according to the invention include those characterized as naphthalimide dyes, perylene dyes, coumarin dyes, anthracene dyes, phenanthracene dyes and thioxanthane dyes. Preferably, the dye is a universal dye which can be used with R12 refrigerant or R134a refrigerant. Exemplary dyes which can be used according to the invention are available from Bright Solutions, Inc. of Troy, Mich.

The lubricant is preferably a universal oil which can be used with R12 refrigerant or R134a refrigerant. Alternatively, the lubricant can be an oil which is specific to R12 refrigerant or R134a refrigerant. Exemplary lubricants which can be used according to the invention include mineral oil, ester oil and polyalkaline glycol oil. Lubricants which can be used according to the invention are available from Bright Solutions, Inc. of Troy, Mich.

Figure 2:
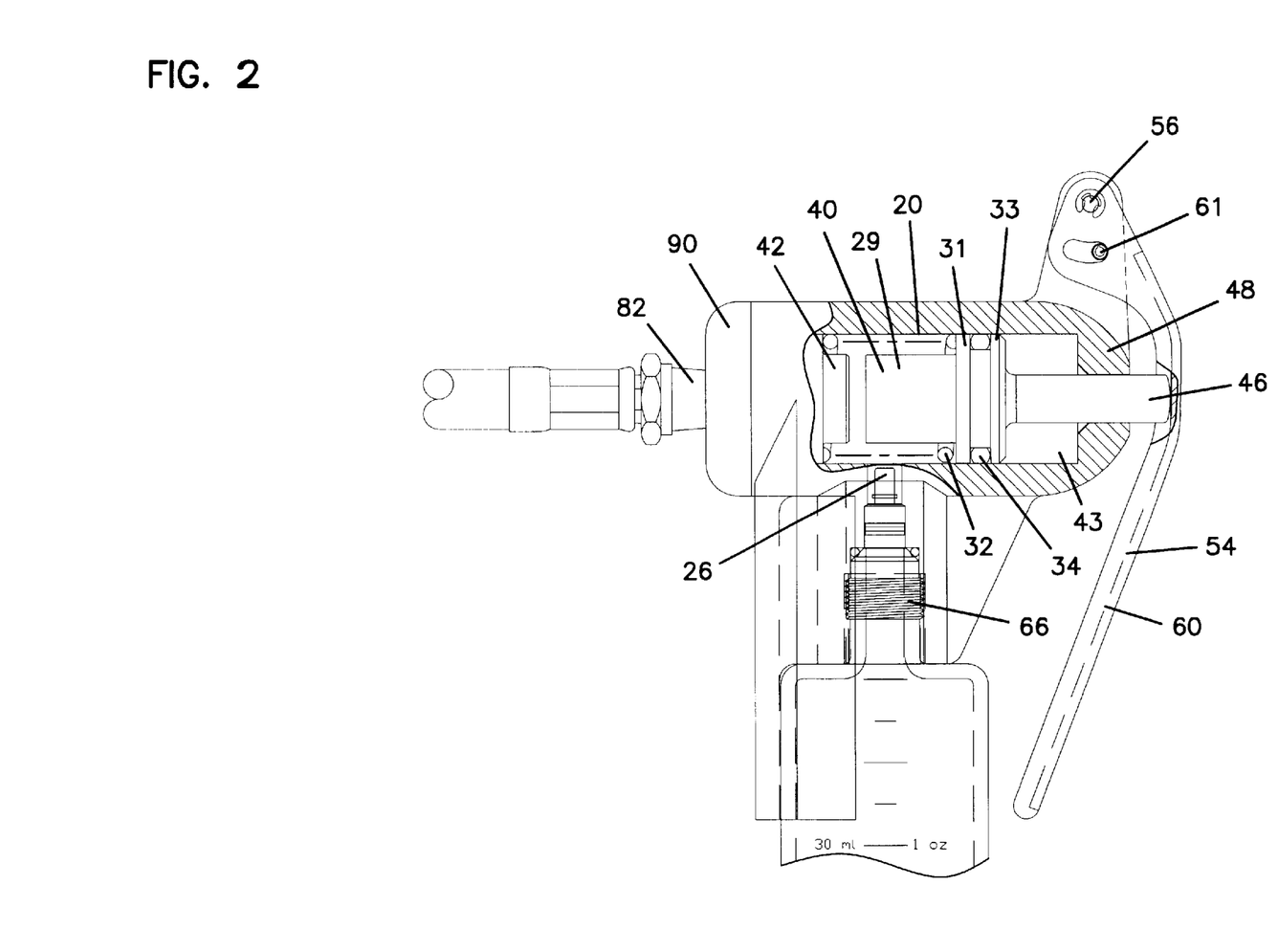
FIG. 2 is a partial cut away view of the pump region of the injector of FIG. 1

Now referring to FIGS. 1 and 2, the pump region 14 includes an interior volume 20 which receives the fluid composition 18 through the pump inflow valve 26. A plunger 28 is provided and shown in its rest position 30 in FIG. 1. The plunger 28 is biased to the rest position 30 because of the spring 32. The plunger 28 preferably includes an O-ring 34 around its circumference to provide a seal between the plunger and the generally cylindrical wall 36 of the interior volume 20. The plunger 28 includes a stem 29 which fits within the spring 32, and inside and outside flanges 31 and 33. The inside flange 31 causes compression of the spring 32, and both the inside flange 31 and the outside flange 33 retain the O-ring 34 in place as the plunger 28 moves. As the plunger 28 moves to the pump position 40, it causes the fluid composition 18 provided within the internal volume 20 to exit through the pump outflow valve 42. As the plunger 28 returns to its rest position 30, it causes fluid composition 18 to flow into the interior volume 20 through the pump inflow valve 26. Accordingly, once the interior volume 20 is primed with fluid composition 18, the movement of the plunger 28 between the rest position 30 and the pump position 40 causes the fluid composition 18 to flow from the receiver region 12 and into the air conditioning system.

The pump inflow valve 26 and the pump outflow valve 42 can be referred to as one-way valves. That is, they allow the fluid composition to flow in only one direction. Preferably, both valves are check valves. Check valves which can be used according to the invention can be obtained from Lee Company of Chicago, Ill.

The movement of the plunger 28 from the pump position 40 to the rest position 30 creates a partial vacuum within the interior volume 20 which draws the fluid composition 18 through the pump inflow valve 26. The pressure created by the plunger 28 as it moves from the rest position 30 to the pump position 40 creates pressure causing the fluid composition 18 to move from the internal volume 20 through the pump outflow valve 42. As the plunger 28 moves from the rest position 30 to the pump position 40, a volume 43 is created which is vented to the atmosphere. Preferably, the venting is along the piston 46.

It should be appreciated that the volume through which the plunger 28 travels is equivalent to the volume of fluid composition 18 which is injected into the air conditioning system for a given cycle of the plunger 28. Accordingly, this volume can be adjusted to provide the desired amount of lubricant and/or dye per cycle. Applicants have found that it is advantageous to provide an injection of about ⅛ ounce to about ½ ounce per cycle, and more preferably an injection of about ¼ ounce per cycle. Accordingly, if one wished to introduce ½ ounce of fluid composition 18 into an air conditioning system through an injector which injects ¼ ounce per cycle, then one would cycle the plunger 28 twice.

The plunger 23 is attached to a piston 46 which extends outside of the pump housing 48. The pump housing 48 includes a hand rest 50 and an arm 52. A handle 54 is rotatably attached to the arm 52 at the joint 56. The handle 54 engages the piston 46 so that as the handle 54 moves between its rest position 58 shown in FIG. 1 and its pump position 60 shown in FIG. 2, the plunger similarly moves between its rest position 30 and its pump position 40. Accordingly, the pump region 14 can be operated by gripping the hand rest 50 and the handle 54, and squeezing to cycle the plunger 28. A retainer pin 61 is provided to prevent the handle 54 from rotating away from the piston 46.

The pressure within a typical automobile air conditioning system is generally between about 50 and about 150 psi. In order to inject the fluid composition 18 into the air conditioning system, the pressure at which the fluid composition is to be injected should exceed the pressure within the air conditioning system. Accordingly, the injector of the invention provides for the generation of pressures which exceed those pressures found in air conditioning systems. By the design of the present invention, the Applicants found that the appropriate pressures for injecting a fluid composition into an air conditioning system can be generated by a single hand squeezing operation.

Figure 3:
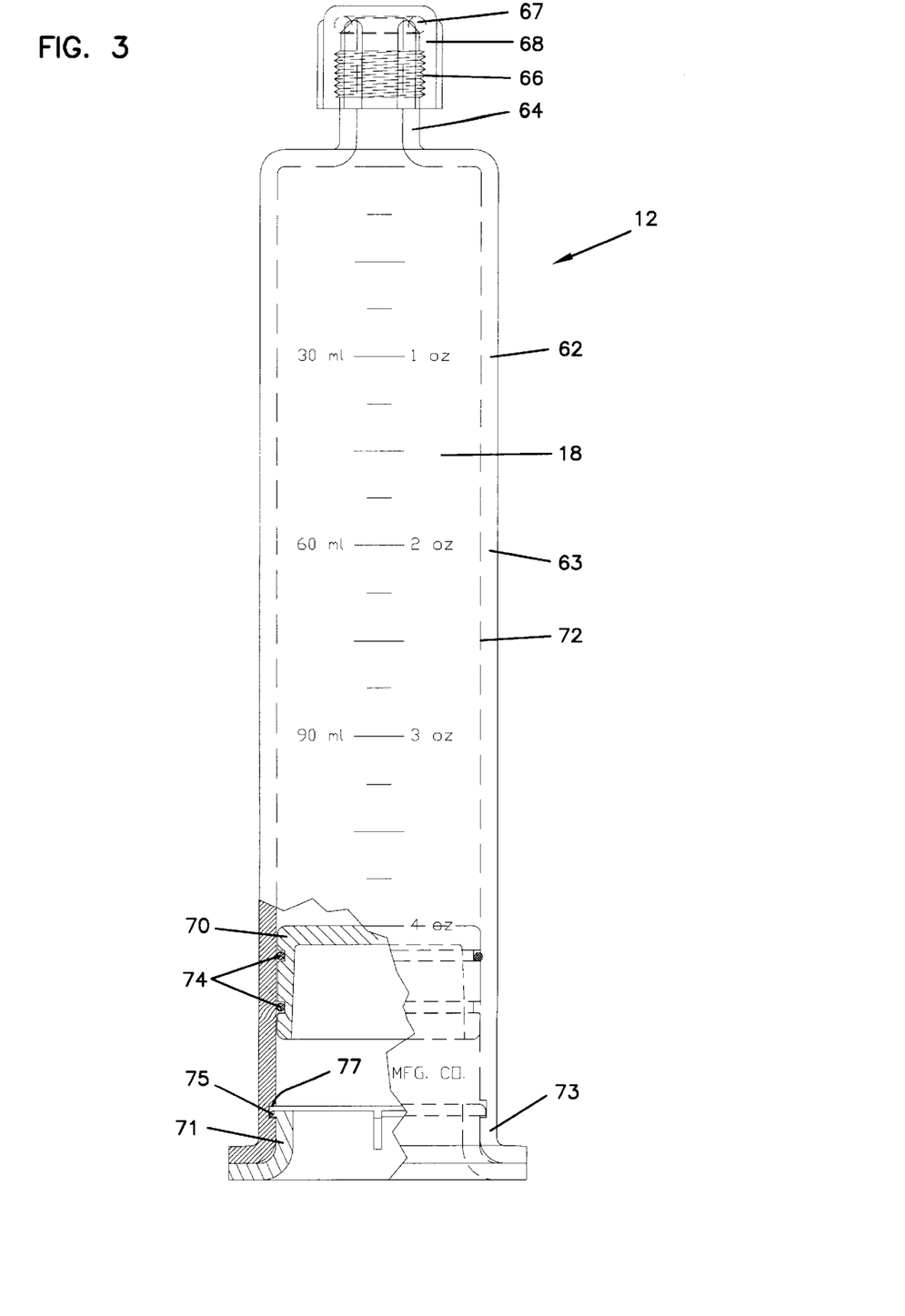
FIG. 3 is a partial cut away view of the cartridge of the injector of FIG. 1.

Now referring to FIG. 3, the receiver region 12 is shown in more detail. The receiver region 12 includes a cartridge 62 for storing the fluid composition 18. The cartridge 62 includes a nozzle 64 including threads 66 provided on the exterior of the nozzle 64. The threads 66 provide for a secure connection of the receiver region 12 to the pump region 14. Accordingly, the threads 66 allow the receiver region 12 to screw onto the pump region 14 and provide a fluid connection with the pump inflow valve 26. While a screw type connection is preferred, it should be appreciated that the connection can be provided by any other known fastening arrangement, such as, a snap-type fastening arrangement.

The cartridge 62 is preferably provided as a prefilled cylinder 63 containing fluid composition 18. A cap 68 can be provided over the nozzle 64 to prevent outflow of fluid composition 18 until the cartridge 62 is inserted into the pump region 14. An O-ring 67 can be provided between the nozzle 64 and the cap 68 to help keep the fluid composition 18 within the cartridge 62. Accordingly, one would remove the cap 68 and screw the nozzle 64 into the pump region 14. Once the fluid composition has been exhausted from the cartridge 62, the cartridge 62 can be removed and replaced with a fresh cartridge.

The cartridge 62 includes a floating stopper 70 which fits within the cylindrical interior wall 72 of the cartridge 62. As the fluid composition is removed from the cylinder 62, the floating stopper 70 moves toward the nozzle 62. O-rings 74 are preferably provided between the floating stopper 70 and the cylindrical interior wall 72 to reduce leakage of the fluid composition and contamination of the fluid composition. A locking ring 71 can be provided at the base 73 of the cartridge 62 to prevent the floating stopper 70 from falling outside the cartridge 62. The locking ring 71 includes a flange 75 which engages a groove 77 in the cylindrical interior wall 72. The locking ring 71 can easily be snapped out of the cartridge 62. It should be appreciated that the cartridge 62 is reusable. That is, once the fluid composition has been removed from the cartridge, the cartridge can be refilled and used again.

The fluid composition 18 flows out of the pump region 14 via the pump outflow valve 42 and through the delivery hose 80. The hose 80 is preferably a standard UL refrigeration hose. The hose 80 is attached to the pump body 48 by the male connector 82. The other end of the hose includes a connector 84 for attachment to an air conditioning system port for injection of the fluid composition inside the air conditioning system. Standard air conditioning system ports, and particularly those used in the automotive industry, include Schroeder valves.

The pump housing 48 includes a cap 90 which is attached in place by fasteners 92. Preferably, the fasteners are screw type fasteners. The cap 90 includes a threaded receiving area 94 into which the male connector 82 can be threaded.

The connector 84 is provided as a Schroeder-type valve connection for connecting to either an R12 or R134a port on an air conditioning system. The connector 84 can be referred to as an anti-blowback connector because it does not allow flow unless the connection is secured. An adapter can be provided which screws onto the connector 84 and provides for attachment to another air conditioning system containing a different refrigerant therein. Typically, air conditioning systems which utilize R12 and R134a include differently sized ports. Accordingly, an adapter can be used with the injector of the invention to inject the fluid composition into either R12 or R134a refrigeration systems. Furthermore, it is an advantage of the invention that the adapter can be used which minimizes leakage of fluid composition. The anti-blowback valves which can be used according to the invention can be obtained from J.E.M. Industries of Willoughby, Ohio.

Figure 4:
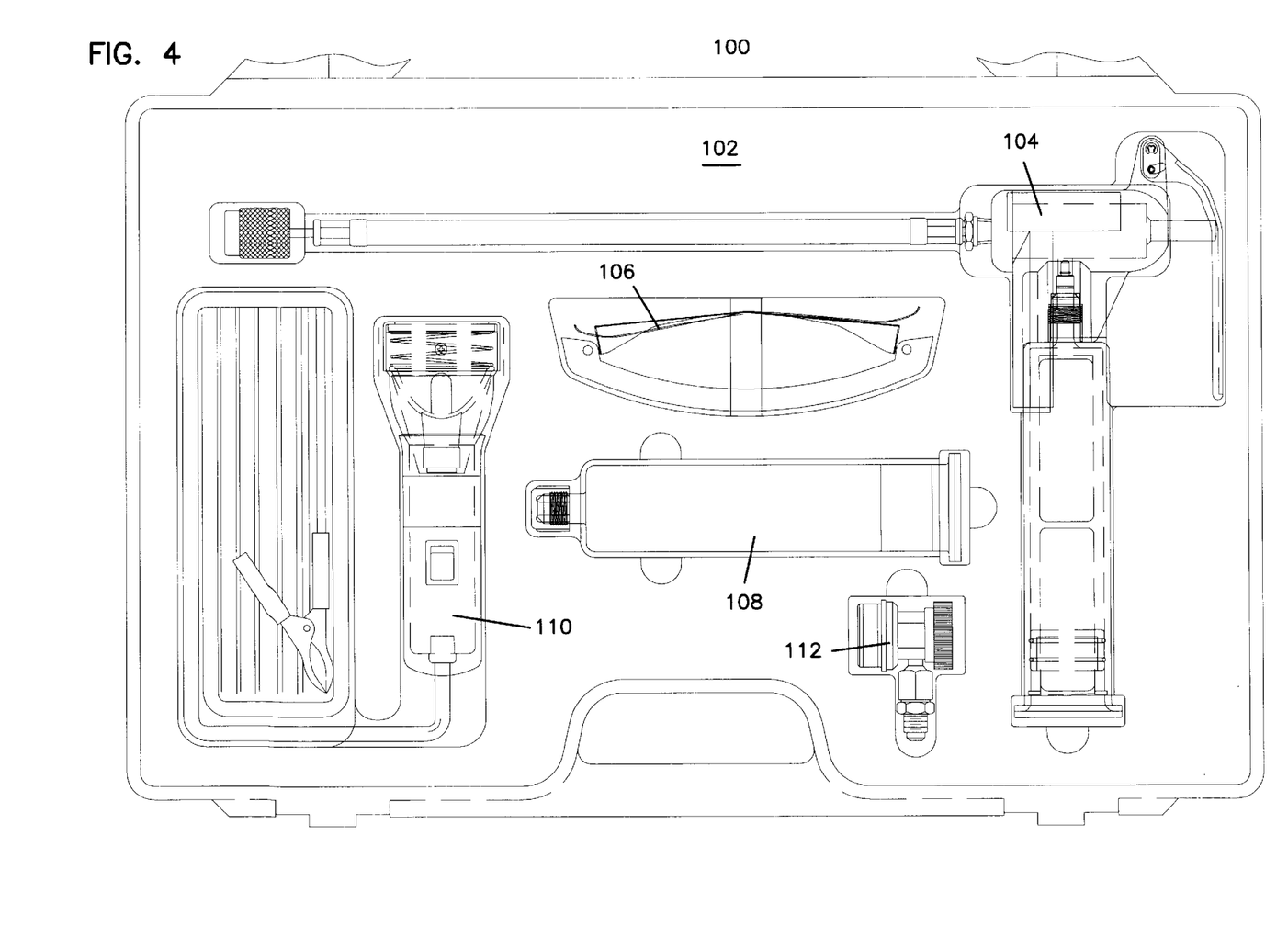
FIG. 4 is a kit for injecting lubricant into an air conditioning system.

Now referring to FIG. 4, a kit for detecting leaks in an air conditioning system is indicated at reference numeral 100. As shown, the kit 100 is provided in a container 102 for holding the various components of the kit. It should be appreciated that the kit can include one or more of the following items in addition to the dye injector 104. Components of the kit can include safety goggles 106, replacement cartridge 108, light emitting device 110 for detecting dye, and adapter 112 for providing easy interchangeability between R12 and R134a air conditioning systems. Preferably, the safety goggles 106 are tinted to assist in the detection of light given off by the dye.

The light emitting device 110 which can be used according to the invention can be any light source which will enhance the detection of the dye which is used. In general, it is expected that the dyes which will be utilized will be fluorescent-producing dyes. Accordingly, it is preferable to use a light source which combines a faceted reflector with a lamp and interference filter to provide a narrowed emission of wavelength of light emitted from the light source. An exemplary light emitting device which can be used according to the invention is described by U.S. Pat. No. 5,674,000, the disclosure of which is incorporated herein by reference. Other light emitting devices for detecting dye are commonly available and can be used according to the invention.

While the invention is described in the context of a preferred embodiments, it should be appreciated that the invention is not limited by the preferred embodiments, but include various embodiments within the scope of the claims.

What is claimed is:

1. An injector for introducing a fluid composition into an air conditioning system comprising:

a pump comprising an internal volume having a first opening and a second opening, and a plunger which moves within the internal volume between a first position and a second position, said first opening including a first valve for selectively allowing the fluid composition to flow from the internal volume as the plunger moves from the first position to the second position, and said second opening including a second valve for selectively allowing the fluid composition to flow into the internal volume as the plunger moves from the second position to the first position;

a hose having a first end connected to the first opening, and a second end constructed for attachment to an air conditioning port; and a cartridge comprising a fluid composition fluidly connected to said second opening.

2. An injector according to claim 1, wherein the pump further comprises a spring for biasing said plunger to the first position.

3. An injector according to claim 1, wherein said plunger further comprises a piston for moving said plunger from said first position to said second position.

4. An injector according to claim 1, wherein the first valve comprises a check valve.

5. An injector according to claim 1, wherein the second valve comprises a check valve.

6. An injector according to claim 1, wherein the fluid composition comprises a lubricant.

7. An injector according to claim 1, wherein the fluid composition comprises lubricant and dye.

8. An injector according to claim 1, wherein the fluid composition comprises a fluorescent dye.

9. An injector according to claim 1, wherein the second end of the hose includes a connector for attachment to one of an R12 or an R134a refrigerant air conditioning port.

10. An injector according to claim 9, further comprising an adapter for connecting to the second end of the hose for attachment to at least one of an R12 or R134a refrigerant air conditioning port.

11. A method for detecting leaks in an air conditioning system, comprising steps of:

(a) providing an injector comprising:

a pump comprising an internal volume having a first opening and a second opening, a plunger which moves within the internal volume between a first position and a second position, and fluid composition comprising a dye provided within the internal volume, said first opening including a first valve for selectively allowing the fluid composition to flow from the internal volume as the plunger moves from the first position to the second position, and said second opening including a second valve for selectively allowing the fluid composition to flow into the internal volume as the plunger moves from the second position to the first position;

a hose having a first end connected to the first opening, and a second end connected to an air conditioning system; and a cartridge comprising a fluid composition fluidly connected to said second opening; and (b) cycling the plunger between the first position and the second position to introduce a measured amount of the fluid composition into the air conditioning system.

12. A method for detecting leaks in an air conditioning system according to claim 11, wherein the fluid composition comprises a lubricant.

13. A method for detecting leaks in an air conditioning system according to claim 11, further comprising a step of:

(a) detecting dye leaking from the air conditioning system.

14. A method for injecting lubricant into an air conditioning system, comprising steps of:

(a) providing an injector comprising:

a pump comprising an internal volume having a first opening and a second opening, a plunger which moves within the internal volume between a first position and a second position, and fluid composition comprising lubricant provided within the internal volume, said first opening including a first valve for selectively allowing the fluid composition to flow from the internal volume as the plunger moves from the first position to the second position, and said second opening including a second valve for selectively allowing the fluid composition to flow into the internal volume as the plunger moves from the second position to the first position;

a hose having a first end connected to the first opening, and a second end connected to an air conditioning system; and a cartridge comprising a fluid composition fluidly connected to said second opening; and (b) cycling the plunger between the first position and the second position to introduce a measured amount of the fluid composition into the air conditioning system.

15. A kit for detecting leaks in an air conditioning system comprising:

(a) an injector comprising:

a pump comprising an internal volume having a first opening and a second opening, and a plunger which moves within the internal volume between a first position and a second position, said first opening including a first valve for selectively allowing a fluid composition comprising dye within the internal volume to flow from the internal volume as the plunger moves from the first position to the second position, and said second opening including a second valve for selectively allowing fluid composition comprising a dye to flow into the internal volume as the plunger moves from the second position to the first position;

a hose having a first end connected to said first opening, and a second end for connection to an air conditioning system; and a cartridge comprising a fluid composition comprising dye fluidly connected to said second opening; and (b) a lamp for exciting the dye.

16. A kit according to claim 15, further comprising a replacement source of fluid composition comprising dye for fluidly connecting to the second opening of said pump.

* * * * *

UNITED STATES PATENT AND TRADEMARK OFFICE
CERTIFICATE OF CORRECTION

PATENT NO. : 6,155,066
DATED : December 5, 2000
INVENTOR(S) : Chandler et al.

It is certified that error appears in the above-identified patent and that said Letters Patent is hereby corrected as shown below:

<u>Title page,</u>
Item [75], Inventors: "Brandon M. Reid" should read -- Branden M. Reid --
Item [56], References Cited, "1,613,821   11/1927   Frawley" should read
-- 1,613,821   1/1927   Frawley --

<u>Column 4,</u>
Line 35, "23" should read -- 28 --

Signed and Sealed this

Thirteenth Day of August, 2002

*Attest:*

*Attesting Officer*

JAMES E. ROGAN
*Director of the United States Patent and Trademark Office*